July 1, 1924.

G. C. STEBBINS 1,499,704

BATTERY BOX

Filed Aug. 24, 1922

Inventor
George C. Stebbins
By Brockett & Hyde
Attorneys

Patented July 1, 1924.

1,499,704

UNITED STATES PATENT OFFICE.

GEORGE C. STEBBINS, OF ASHTABULA, OHIO, ASSIGNOR TO SILURIUM MANUFACTURING COMPANY, OF CLEVELAND, OHIO, A CORPORATION OF DELAWARE.

BATTERY BOX.

Application filed August 24, 1922. Serial No. 584,061.

*To all whom it may concern:*

Be it known that I, GEORGE C. STEBBINS, a citizen of the United States, residing at Ashtabula, in the county of Ashtabula and State of Ohio, have invented certain new and useful Improvements in Battery Boxes, of which the following is a specification.

This invention relates to battery boxes and particularly to the arrangement for sealing the cover in place.

As heretofore constructed the covers of battery boxes have been held in place by a suitable sealing compound usually made of asphaltum, pitch or some suitable fusible gum or other material which is worked into place around the edges of the cover to seal it in place. Under the strain of use the joint between the sealing compound and either the cover or box wall frequently works loose or open so that acid escapes, not only causing deterioration of the cell itself but with possible injury to parts with which the acid may come in contact.

The present invention has for its object to generally improve the construction of the box by providing a special form of channel or seat for the sealing compound, the arrangement being such as to afford a more firm or secure bond between the sealing compound and the wall of the box and a more tortuous passage so that in any event acid is less likely to escape.

Further objects of the invention are in part obvious and in part will appear more in detail hereinafter.

Figure 1:
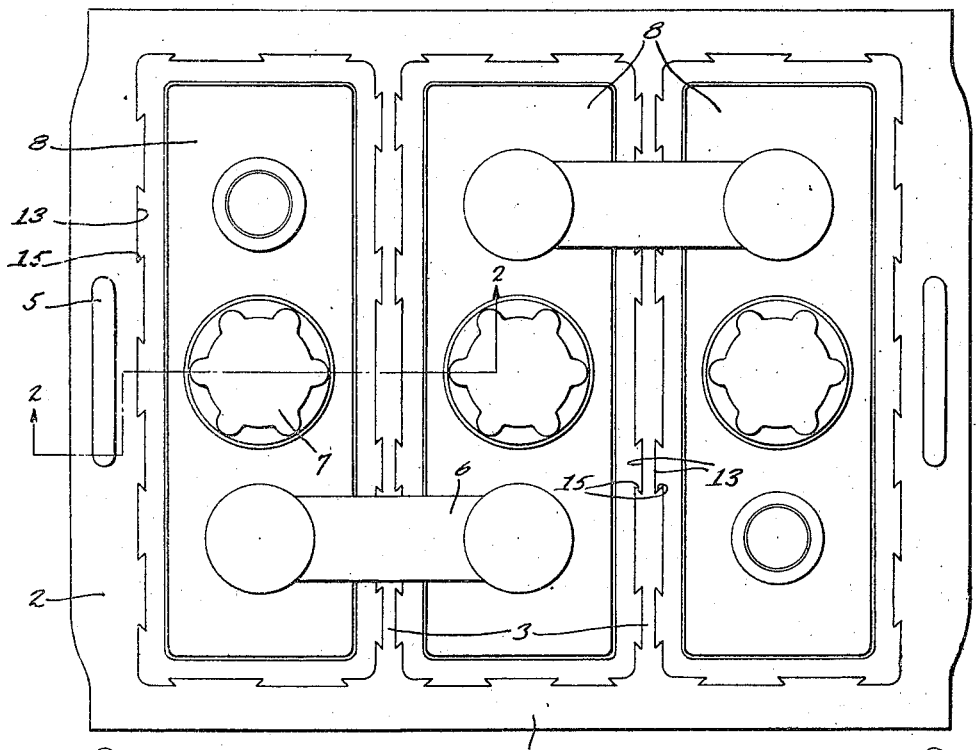
Figure 2:
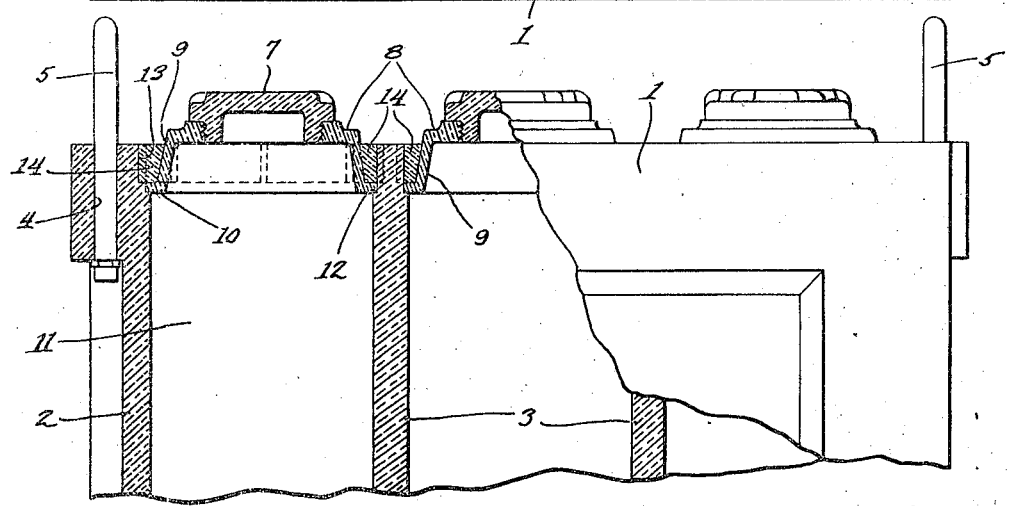

In the drawings, which represent one suitable embodiment of the invention, Fig. 1 is a plan view; and Fig. 2 is an elevation of one side of the box, part of the cells being broken out and in elevation on the line 2—2, Fig. 1.

The invention may be used with battery boxes of any form and construction and made of any suitable material. The box shown in the drawings is a one-piece molded box formed of a suitable rubber-like composition molded into hard solid form. Said box comprises side and end walls 1, 2 connected by cross partitions 3, the end walls being thickened or reinforced at their upper ends to receive openings 4 through which are passed the shanks of the bail-like handle members 5. The box shown has two partitions and consequently three cells. 6 represents the bonds or connectors between electrodes in the different cells, and 7 filling caps threaded into openings in the cell cover members 8, each of which has inclined side walls 9 and bottom horizontal flanges 10. The bottom flanges of the covers are made of such external size as to fit snugly within the cell walls and seat either directly upon the battery plates, indicated generally at 11, or, if desired, upon slight shoulders 12 in the box walls. The inclination of the side walls 9 of the covers is so formed and the box walls and partitions are so arranged that when the covers are pushed home to their final position, as shown in Fig. 2, the cover flanges are below the upper edges of the box walls. Around all the edges of each cover the box walls, including both the side and end walls and the cross walls or partitions, are provided with a recess or groove, indicated generally at 13, forming with the external space in that part of the cover below the top of the box a fairly large circumferentially extending channel to receive the sealing compound. The outer walls of this channel—those walls which are in the walls of the box itself, are preferably of continuous dove-tail form, as indicated at 13, Fig. 1. Consequently, when the channel is filled with the fusible sealing compound 14, separated portions of said compound flow into the dovetail recesses 15, so that the sealing compound is firmly bound or tied to the box walls and will not readily separate therefrom. The compound itself is somewhat flexible and will move slightly with slight flexing of the side or end box walls, but a clear joint or crack will not open up, and the escape of acid is therefore practically wholly prevented.

What I claim is:—

1. A battery box, comprising side and end walls surrounding a cell chamber, said walls being provided with a channel having separated dovetail portions, a cover for said box, and a sealing compound filling the dovetail portions of said recess and holding the cover in place.

2. A battery box, having side and end walls and cross partitions forming a plurality of cell chambers, said side and end walls and partitions being provided around their upper edges with channels having dovetail portions, a cover for each cell chamber, and fusible sealing material filling said dovetail grooves and holding the covers in place and preventing the escape of acid.

In testimony whereof I hereby affix my signature.

GEORGE C. STEBBINS.